United States Patent [19]
Schmidt

[11] 3,882,681
[45] May 13, 1975

[54] EXHAUST INSTALLATION FOR A ROTARY PISTON INTERNAL COMBUSTION ENGINE

[75] Inventor: Karl-Walter Schmidt, Beutelsbach, Germany

[73] Assignee: Daimler-Benz Aktiengesellschaft, Germany

[22] Filed: Nov. 27, 1972

[21] Appl. No.: 309,916

[30] Foreign Application Priority Data
Nov. 27, 1971 Germany............................ 2158963

[52] U.S. Cl. .................... 60/901; 60/314; 123/8.01; 123/8.05; 123/8.45
[51] Int. Cl. ............................................. F02b 53/00
[58] Field of Search ....... 123/8.01, 8.05, 8.07, 8.13, 123/8.45; 60/312, 314, 901

[56] References Cited
UNITED STATES PATENTS
| | | | |
|---|---|---|---|
| 3,254,484 | 6/1966 | Kopper | 60/312 |
| 3,722,493 | 3/1973 | Hartmann | 60/901 UX |
| 3,726,092 | 4/1973 | Raczuk | 60/314 |

FOREIGN PATENTS OR APPLICATIONS
| | | | |
|---|---|---|---|
| 1,190,795 | 5/1970 | United Kingdom | 60/314 |
| 1,451,719 | 7/1969 | Germany | 123/8.01 |
| 1,213,718 | 11/1970 | United Kingdom | 123/8.01 |

Primary Examiner—Clarence R. Gordon
Attorney, Agent, or Firm—Craig & Antonelli

[57] ABSTRACT

An exhaust system for a rotary piston internal combustion engine, especially of trochoidal construction, with a polygonal piston rotating within a housing and with working chambers between the housing and the piston whereby one inlet channel and one exhaust channel are arranged in the housing per disk; an exhaust pipe adjoins the exhaust channel, and the exhaust channel and exhaust pipe have such a cross section that the exhaust gases flow through the same at nearly the speed of sound at full load and at approximately maximum rotational speed of the engine; the exhaust channel and exhaust pipe have thereby together such a length up to the first reflecting surface formed, for example, by a shoulder or offset of the exhaust pipe end that a pressure front travelling in the exhaust gas under these operating conditions with the velocity of sound, which at the instant of the start of the exhaust travels from the beginning of the exhaust channel within the latter and within the exhaust pipe, reaches the beginning of an exhaust channel of a disk after at least one reflection at the first reflecting surface at the instant when this disk is at the instant of the intake end.

12 Claims, 5 Drawing Figures

EXHAUST INSTALLATION FOR A ROTARY PISTON INTERNAL COMBUSTION ENGINE

The present invention relates to an exhaust installation for a rotary piston internal combustion engine, especially of trochoidal type of construction, with one polygonal piston, per disk, rotating within a housing and with working chambers between the housing and the piston, whereby one inlet channel and one outlet or exhaust channel are arranged, per disk, in the housing, an exhaust pipe adjoining the exhaust channel.

In such prior art exhaust installations, the exhaust pipe was made as large as possible in cross section in order to obtain as small as possible a back-pressure and therewith a high output of the rotary piston internal combustion engine, which cross section was limited exclusively by the noise development and the possibility for sound damping. These prior art exhaust pipes have a great length up to their first offset or shoulder which is based on the fact that a pressure wave is to form therein which effects a pressure peak in the exhausting working chamber precisely at the instant when the leading or preceding intaking working chamber is at the intake end so that a pressure peak arriving in the inlet channel feeds fresh gases into the intaking working chamber and not into the exhausting working chamber and thus effects a good filling of the intaking working chamber. These great lengths of the exhaust pipes entail the disadvantage that several exhaust pipes can be combined or joined only far downstream of the rotary piston internal combustion engine and that with the use of an afterburner installation, the latter is located at a place where the exhaust gases have already been far-reachingly cooled off and thus hardly react anymore.

The present invention is concerned with the task to eliminate the aforementioned disadvantages and to provide an exhaust installation which, with a short length of the exhaust pipe, does not prevent a filling of the working chambers necessary for a large power output and a high efficiency of the engine.

The underlying problems are solved according to the present invention in that the exhaust channel and the exhaust pipe have such a cross section that the exhaust gases flow within the same with nearly the speed of sound at full load and at approximately maximum rotational speed of the rotary piston internal combustion engine, and that together they possess such a length up to the first shoulder or offset forming a reflecting surface that under this operating condition a pressure front travelling in the exhaust gases with the speed of sound, which at the start of the exhaust travels from the beginning of the exhaust channel within the same and within the exhaust pipe, reaches after a reflection at the first shoulder or offset the beginning of an exhaust channel of a disk at the instant at which in this disk thhe termination or end of the intake has been reached.

With the exhaust installation according to the present invention with a chamber volume of, for example, about 600 ccm and a maximum rotational speed of 7,000 rpm, the diameter of the exhaust pipe is approximately 25 mm, i.e., therefore considerably smaller than with the hitherto customary exhaust pipes. This means that the exhaust gases flow in the exhaust channel and in the exhaust pipe with a velocity which lies only slightly below the speed of sound which is about 700 m/sec at an exhaust gas temperature of about 1,000°C.

If the exhaust channel is now suddenly released or opened up by the piston, then a pressure front is formed at the beginning of the exhaust channel which continues to travel with the speed of sound relative to the exhaust gases in the exhaust channel and in the exhaust pipe. This pressure front is reflected at the first shoulder or offset, for example, at the junction of several exhaust pipes or at an installed afterburner installation, and moves back to the beginning of an outlet channel. During this return, the pressure front moves relative to the exhaust pipe at the small difference velocity between the speed of sound and the flow velocity of the exhaust gases. The lengths of the exhaust channel and of the exhaust pipe can thus be kept small if a predetermined time interval is provided within which the pressure front is to have returned into the exhausting working chamber. This time interval is determined by the time between the beginning or start of the exhaust and the end or termination of a following intake, i.e., with a rotary piston internal combustion engine with a single disk having one inlet channel and one exhaust channel in the casing of the housing, the time which is needed by a piston corner for traversing the distance between the exhaust channel and the inlet channel.

In addition to the advantages that the afterburner installation and junctions of several exhaust pipes can be physically located and installed very close to the engine housing, further advantages result from the exhaust installation according to the present invention. Thus, both by reason of the slight length as also by reason of the smaller diameter, a small structural volume with lesser expenditures in expensive material is made possible since such material has to be heat-resistant. The slight mass of the exhaust pipe also brings about that the latter is heated up rapidly after a cold start which is of use with an afterburner installation. Since the exhaust pipe has a small surface up to the afterburner installation, only relatively small amounts of heat can be radiated by the same so that the exhaust gases are still very hot upon reaching the exhaust burner installation.

In one advantageous construction of the present invention, the pressure front reaches the beginning of the exhaust channel at the intake end after repeated reflections, for example, after double reflection at the first offset or shoulder, again considered at full load and approximately maximum rotational speed of the rotary piston internal combustion engine.

By reason of this construction, the length of the exhaust channel and exhaust pipe together can be kept still shorter since notwithstanding the short length, the pressure front then traverses the same length of path with a multiple reflection as with a single reflection and with a greater length of exhaust channel and of the exhaust pipe. A further considerable advantage resides in that with an only slightly increased rotational speed of the rotary piston internal combustion engine, the pressure front reaches the beginning of an exhaust channel at the instant of the intake end already after a smaller number of reflections since under the indicated operating condition the velocity of the exhaust gases in the exhaust channel and in the exhaust pipe approaches rapidly the speed of sound with increasing rotational speed so that the velocity of the pressure front relative to the exhaust channel and the exhaust pipe approaches rapidly zero during the return. If the rotational speed of the rotary piston internal combustion engine is increased above the rotational speed at which the pressure front reaches after several reflections the beginning of an exhaust channel at the instant of the intake end, then the pressure front cannot reach at all the beginning of the exhaust channel within the time interval up to the instant of the intake end. As a result thereof, the pressure in the intaking working chamber belonging to the same disk as the exhaust channel decreases so that the output of the rotary piston internal combustion engine decreases and an exceeding of the maximum rotational speed is prevented thereby.

According to a further feature of the exhaust installation for a rotary piston internal combustion engine with several disks, whose exhaust pipes are combined or joined at the exhaust pipe end, the pressure front travels from the beginning of the exhaust channel of one disk, possibly after several reflections at the exhaust pipe end, to the beginning of the exhaust channel of another disk. Reflection means therefore in that case the reflection of the pressure front into the same or into another exhaust pipe.

As a result of this construction of the present invention, the exhaust channels and exhaust pipes of a rotary piston internal combustion engine with several disks, whose eccentrics are mutually offset, can be constructed still shorter. More particularly, the time interval from the exhaust beginning to the intake end in different disks is shorter by such an amount than the time interval between the exhaust beginning and intake end in the same disk as the eccentric shaft requires for the rotation through the angle by which the eccentrics of these two disks are offset with respect to one another.

Accordingly, it is an object of the present invention to provide an exhaust installation for a rotary piston internal combustion engine which avoids by simple means the aforementioned shortcomings and drawbacks encountered in the prior art.

Another object of the present invention resides in an exhaust installation for a rotary piston internal combustion engine which permits the physical location of an afterburner installation sufficiently close to the engine so that the exhaust gases reach the afterburner sufficiently hot and thus are able to react readily in the exhaust afterburner.

A further object of the present invention resides in a rotary piston internal combustion engine with an exhaust installation which permits a reduction of the length of the exhaust pipes notwithstanding high power output and good efficiency of the engine.

Still another object of the present invention resides in an exhaust installation for a rotary piston internal combustion engine in which the physical lengths of the exhaust channel and of the exhaust pipe of each disk can be kept relatively short, thus permitting the actual installation of the afterburner close to the housing of the engine.

Another object of the present invention resides in an exhaust system for a rotary piston internal combustion engine which avoids the need for high expenditures in connection with expensive heat-resistant material while assuring rapid warm-up of the exhaust system.

A further object of the present invention resides in an exhaust installation for a rotary piston internal combustion engine in which the output of the engine automatically decreases when the maximum rotational speed is exceeded, thus providing an automatic speed limit means for the engine.

These and other objects, features and advantages of the present invention will become more apparent from the following description when taken in connection with the accompanying drawing which shows, for purposes of illustration only, one embodiment in accordance with the present invention and wherein.

Figure 1:
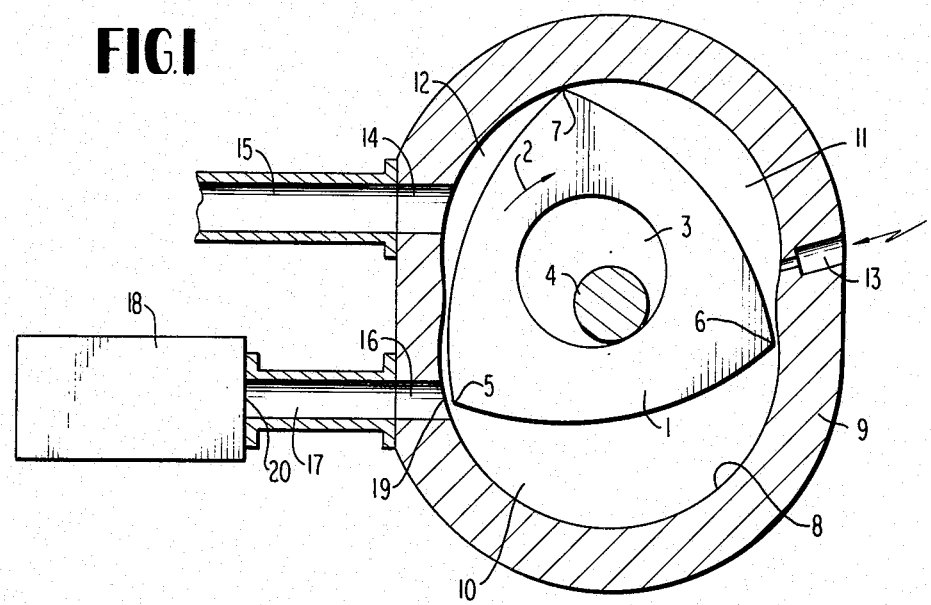
FIG. 1 is a somewhat schematic cross-sectional view through one disk of a rotary piston internal combustion engine with an exhaust installation according to the present invention, illustrated at the instant of the beginning of the exhaust.
Figure 2:
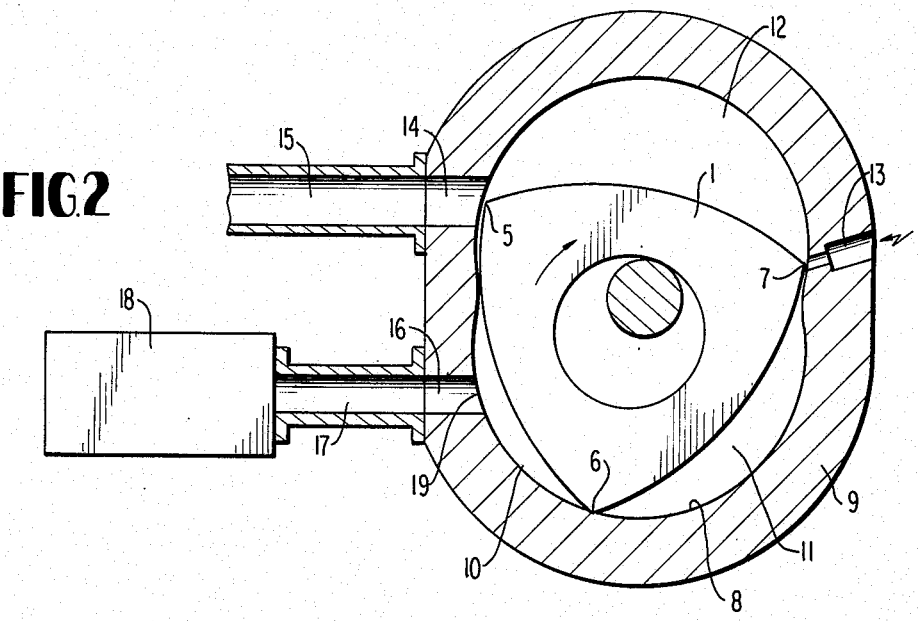
FIG. 2 is a cross-sectional view through the same disk as shown in FIG. 1, at the instant of the end of the intake.

Referring now to the drawing wherein like reference numerals are used throughout the various views to designate like parts, and more particularly to FIGS. 1 and 2, reference numeral 1 designates therein a triangular piston which rotates in the direction of arrow 2 on an eccentric 3 of an eccentric shaft 4. The piston 1 slides with its corners 5, 6 and 7 along a trochoidal running surface 8 which inwardly delimits a casing 9. Three working chambers 10, 11 and 12 are present between the piston 1 and the trochoidal running surface 8. An ignition source of conventional type arranged in the casing 9 is schematically indicated by reference numeral 13. An inlet channel 14 with an inlet pipe 15 disposed upstream thereof and an exhaust channel 16 with an adjoining exhaust pipe 17 are arranged within the casing 9. A schematically illustrated afterburner installation 18 of any conventional construction adjoins the exhaust pipe 17.

The piston 1 is illustrated in FIG. 1 in the position in which the corner 5 sweeps over the beginning 19 of the exhaust channel 16. The working chamber 12 leading or preceding the corner 5 sucks in fresh gases out of the inlet channel 14 whereas the combustion gases of the working chamber 10 trailing the corner 5 commence to flow out into the exhaust channel 16. The diameter of the exhaust channel 16 and of the exhaust pipe 17 is so dimensioned that at maximum load and approximately at maximum rotational speed of the rotary piston internal combustion engine the exhaust gases flow within the exhaust channel 16 and in the exhaust pipe 17 with nearly the speed of sound. With the sudden release of the exhaust channel 16 for the combustion gases of the working chamber 10, a pressure front forms at the beginning 19 of the exhaust channel 16, which traverses the exhaust channel 16 and the exhaust pipe 17 up to the end 20 thereof with the speed of sound relative to the flowing exhaust gases. The pressure front is thereby reflected by the shoulder or offset which constitutes a reflecting surface and which is formed as a result of the connection of the afterburner installation 18 and thus travels back quickly to the beginning 19 of the exhaust channel 16. The length of the exhaust channel 16 and of the exhaust pipe 17 are together so dimensioned that the pressure front reaches the beginning 19 of the exhaust channel 16 and builds up an increased pressure in the exhausting working chamber 10 at the instant when with approximately maximum rotational speed of the rotary piston internal combustion engine, the piston corner 5 has just passed over or swept over the inlet channel 14 (FIG. 2). As a result thereof, a pressure lying above the atmospheric pressure can be built up at the time of the intake end within the intaking working chamber 12 from the inlet channel 14, without the fact that this increased pressure can escape into the working chamber 10.

Figure 3:
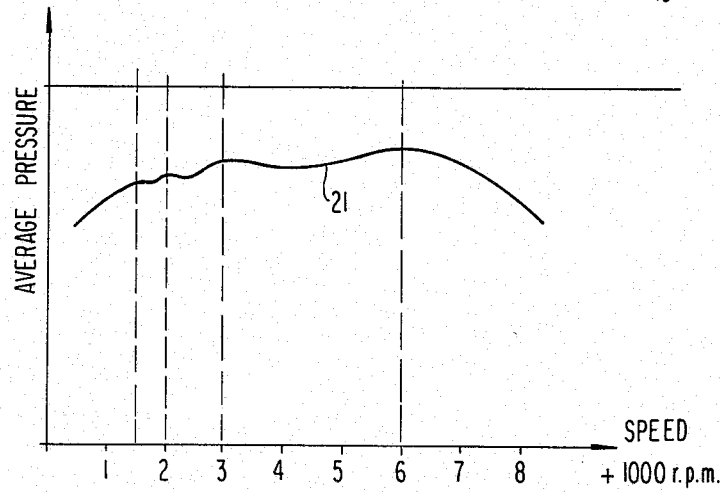
FIG. 3 is a diagram indicating the average pressure in the working chambers obtainable with the exhaust installation according to the present invention.

An increased pressure is possible in the working chambers 10, 11 and 12 especially also when the pressure front after repeated traversal of the exhaust channel 16 and of the exhaust pipe 17 reaches the exhausting working chamber 10 exactly at the instant of the intake end of the intaking working chamber 12. This is the case when the rotational speed of the rotary piston internal combustion engine amounts to one-half, one-third, etc. of the rotational speed indicated above. This relationship is indicated in FIG. 3 in which the average pressure in a working chamber 10, 11 or 12 is plotted against the rotational speed of the rotary piston internal combustion engine. The maximum of the average pressure 21 is reached, for example, at 6,000 rpm. In that case the pressure front returns only once to the exhausting working chamber 10 at the instant of the intake end. With further increased rotational speed, the pressure front cannot return by the desired instant of time; consequently, the average pressure and the output of the rotary piston internal combustion engine decrease and an excess rotational speed of the engine is prevented thereby. Relative maxima of the average pressure 21 also exist at rotational speeds of 3,000, 2,000 and 1,500 rpm, i.e., at rotational speeds at which the pressure front reaches the exhausting working chamber 10 at the instant of the intake end exactly after double, triple and quadruple reflection. The average pressures at lower rotational speeds are thus slightly lower than at the indicated maximum rotational speed, but are still considerably higher than without the use of the pressure front.

Figure 4:
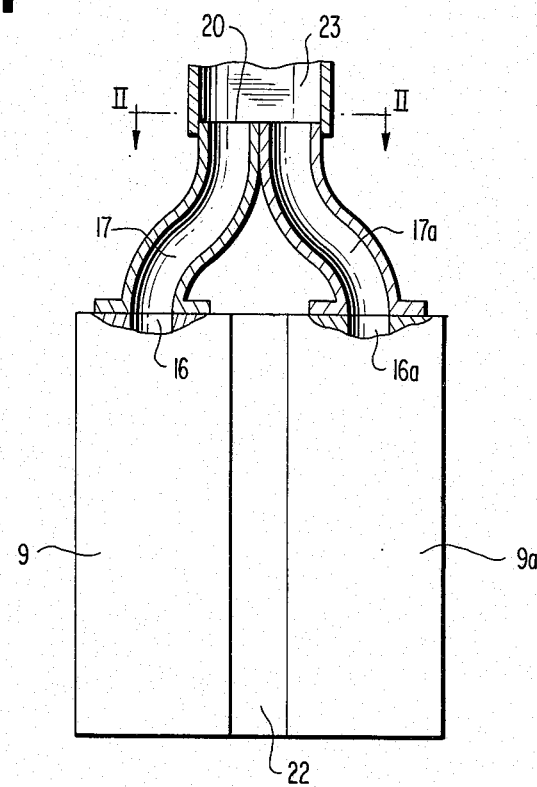
FIG. 4 is a partial cross-sectional view of an alternate embodiment of the present invention.

According to FIG. 4, two disks 9, 9a are provided and interconnected by a housing 22. The exhaust pipes 17, 17a of the respective disks terminate in a pipe section 23 or directly into the afterburner 18.

Figure 5:
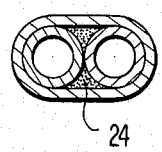
FIG. 5 is a cross-sectional view taken along line II—II of FIG. 4.

As shown in FIG. 5, the space 24 between the pipes 17, 17a, 23 is sealed to prevent the escaping of gases in the downward direction and the pressure waves generated are reflected at the point 20 into both exhaust pipes 17, 17a.

By the arrangement of FIGS. 4 and 5 a pressure front travels from the beginning of the exhaust channel means of one disk to the beginning of the exhaust channel means of the other disk.

While I have shown and described two embodiments in accordance with the present invention, it is understood that the same is not limited thereto but is susceptible of numerous changes and modifications as known to those skilled in the art. Hence, I do not wish to be limited to the details shown and described herein but intend to cover all such changes and modifications as are encompassed by the scope of the appended claims.

I claim:

1. An exhaust installation for a rotary piston internal combustion engine having at least one disk, each disk having polygonal piston means rotating within a housing means provided with internal trochoidal running surface means, each polygonal piston means including spaced corner portions sliding along said internal trochoidal surface means, and working chamber means formed between the housing means and the respective corner portions of said polygonal piston means, one inlet channel means and one exhaust channel means being provided in the housing means for each disk, the installation comprising: an exhaust pipe means being connected to a respective exhaust channel means, at least one reflection surface means provided in said exhaust gas pipe means at a predetermined distance from the working chamber means to reflect the exhaust gases, the exhaust channel means and said exhaust pipe means having a predetermined cross section to cause the flow of exhaust gases therein at nearly the speed of sound at substantially full load and at approximately maximum rotational speed of the engine, the length of said exhaust channel means and said exhaust pipe means constituting said predetermined distance to said at least one reflection surface means, whereby, at substantially full load and approximately maximum rotational speed, one of the corner portions of the polygonal piston means sliding along said internal trochoidal running surface means slides past the beginning of said exhaust channel means and releases the exhaust gases from said working chamber means into said exhaust channel means creating a pressure front travelling in the exhaust gases at substantially the speed of sound relative to the flowing exhaust gases, said pressure front starts travelling from the beginning of the exhaust channel means within the same and within said exhaust pipe means and reaches after reflection at said reflection surface means the beginning of the exhaust channel means of a disk at the instant at which said one of the corner portions of the polygonal piston means slides past the beginning of said inlet channel means in said last-mentioned disk.

2. An exhaust installation according to claim 1, wherein said reflection means is a shoulder.

3. An exhaust installation according to claim 2, wherein said shoulder is constituted by an exhaust pipe end.

4. An exhaust installation according to claim 3, wherein the engine is of trochoidal construction.

5. An exhaust installation according to claim 4, wherein said pressure front reaches the beginning of the exhaust channel means at the instant of the intake end after multiple reflections at said reflection surface means.

6. An exhaust installation according to claim 5, wherein said multiple reflections form a double reflection at said first reflection surface means.

7. An exhaust installation according to claim 6, wherein the rotary piston internal combustion engine has several disks, each of said disks being provided with exhaust pipe means, means for combining the exhaust pipe ends, and wherein said pressure front travels from the beginning of the exhaust channel means of a disk to the beginning of an exhaust channel means of another disk.

8. An exhaust installation according to claim 7, wherein said pressure front travels from the beginning of the exhaust channel means of one disk to the beginning of the exhaust channel means of another disk after several reflections at an exhaust pipe end.

9. An exhaust installation according to claim 1, wherein the rotary piston internal combustion engine has several disks, each of said disks being provided with exhaust pipe means, means for combining the exhaust pipe ends, and wherein said pressure front travels from the beginning of the exhaust channel means of a disk to the beginning of the exhaust channel means of another disk.

10. An exhaust installation according to claim 9, wherein said pressure front travels from the beginning of the exhaust channel means of one disk to the beginning of the exhaust channel means of another disk after several reflections at a reflection surface means.

11. An exhaust installation according to claim 1, wherein said pressure front reaches the beginning of the exhaust channel means at the instant of the intake end after multiple reflections at said reflection surface means.

12. An exhaust installation according to claim 11, wherein said multiple reflections form a double reflection at said first reflection surface means.

* * * * *